United States Patent [19]

Chatterjee

[11] Patent Number: 5,141,772
[45] Date of Patent: Aug. 25, 1992

[54] PROCESS FOR COATING POLYOLEFIN GRANULES IN A FLUIDIZED BED

[75] Inventor: Ananda M. Chatterjee, Houston, Tex.

[73] Assignee: Shell Oil Company, Houston, Tex.

[21] Appl. No.: 779,670

[22] Filed: Oct. 21, 1991

[51] Int. Cl.⁵ ............................................. B05D 7/24
[52] U.S. Cl. ................................... 427/213; 427/222; 118/303; 428/407
[58] Field of Search ................ 427/213, 222; 428/407; 118/62, 303

[56] References Cited

U.S. PATENT DOCUMENTS

| | | | |
|---|---|---|---|
| 3,271,185 | 9/1966 | Pollock | 427/213 |
| 3,591,409 | 7/1971 | Aubrey et al. | 428/407 |
| 4,207,358 | 6/1980 | Johnson | 427/213 |
| 4,517,246 | 5/1985 | Matsuyama et al. | 428/407 |
| 4,960,617 | 10/1990 | Chatterjee et al. | 427/222 |

*Primary Examiner*—Michael Lusignan
*Assistant Examiner*—Terry J. Owens

[57] ABSTRACT

A low temperature process for coating polymer granules with additives in order to modify the properties of the polymer comprises contacting a fluidized bed of the polymer granules with an aqueous dispersion of additives.

12 Claims, No Drawings

5,141,772

PROCESS FOR COATING POLYOLEFIN GRANULES IN A FLUIDIZED BED

FIELD OF THE INVENTION

This invention relates to an improved process for the provision of additives to polymeric materials. More particularly, the invention relates to a process of contacting a fluidized bed of polymer granules with a dispersion of additives whereby the additives are incorporated onto the polymer.

BACKGROUND OF THE INVENTION

The polymerization of lower α-olefins to produce polyolefins is an industry of substantial significance. The polymeric products are of economic importance because of the relatively low cost thereof and the desirable properties they exhibit. However, to obtain polymers of commercially acceptable properties it is generally necessary to incorporate one or more additives into or onto the polymeric material. Such additives include thermo-oxidative stabilizers, U.V. stabilizers, processing stabilizers, acid acceptors and other materials chosen to modify the processability and properties of the polymeric substrate. The provision of such additives to the polymer does present some difficulty on occasion. One conventional method of incorporating additives such as stabilizers into a polyolefin polymer involves the extrusion step typically employed to produce the polymer in pellet form. Stabilizers are mixed with the polymer feed to the extruder and stabilized compositions are produced by the mixing associated with the extrusion. The resulting stabilized polymer is in the physical form of pellets and much of the commercial polyolefin, particularly polypropylene, is marketed in this form. The extrusion method, although widely practiced, has disadvantages in that the polymer and/or additive may degrade under the conditions of heat and shear encountered in the extrusion and the process is energy-intensive.

In U.S. Pat. No. 3,591,409 there is disclosed a method of coating resin particles which involves high intensity mechanical mixing of a polymer with additives and a binder. In U.S. Pat. No. 4,517,246 there is claimed a polymeric material which has been coated with additives and a binder through the use of a mechanical mixer. In Chatterjee, U.S. Pat. No. 4,960,617, there is disclosed a method of stabilizing polypropylene after passage from the polymerization reactor. This method involves application of additives dispersed in hot, molten wax. In U.S. Pat. No. 3,271,185 a process is described wherein vaporizable antioxidant is added to a fluidized bed of polymer. It would be of advantage, however, to provide an improved method of applying additives to polymeric materials, as well as the additive-incorporating polymer compositions produced by that process.

SUMMARY OF THE INVENTION

The present invention provides an improved process for the provision of additives to polymeric material as well as the compositions thereby produced. More particularly, the invention provides a process of applying an aqueous dispersion of additives to a fluidized bed of polymer granules. The process is a relatively low temperature, non-extrusion method of producing additive-containing polymer compositions.

DESCRIPTION OF THE INVENTION

The methods of producing the polymeric materials to which the process of the invention is applied are well known and understood in the art. Although the process of the invention is advantageously applied to a variety of polymeric materials, particularly thermoplastic polymeric materials, in a preferred embodiment of the invention the polymer to be utilized is a polymer or copolymer of at least one lower α-olefin of up to 6 carbon atoms inclusive, preferably at least one straight-chain lower α-olefin of up to 4 carbons inclusive, e.g., ethylene, propylene, 1-butene and copolymers thereof. The process of polymerizing such olefins is conducted in the presence of a polymerization catalyst and is a gas-phase process in the substantial absence of reaction diluent or is a liquid-phase or "slurry-phase" process in the presence of an inert diluent such as heptane or a bulk liquefied monomer, e.g., propylene. The process is suitably conducted in a batchwise, semi-continuous or continuous manner and is suitable for the production of homopolymer when a single α-olefin is fed to the polymerization reactor or for the production of copolymer or terpolymer as when two or three or even more α-olefins are provided. In a conventional process, regardless of process type, the polymer product is removed from the polymerization reactor periodically or continuously and is separated from the other product mixture components. The polyolefin is typically recovered as granules whose size and shape depend in part upon the particular catalyst and process used. As a part of converting the initial polymerization product to a marketable commodity, it is usually necessary to provide one or more additives to the polymer product to improve stability or other characteristics which may be determined by the particular end use contemplated for the polymer. Such provision may comprise incorporation of the additives within the polymer or the coating of the polymer granules with additive. It is this latter method to which the process of the invention particularly applies.

The improved process of the invention is a low temperature, post-reactor, non-extrusion process of applying additives to a polyolefin polymer. In the process, the polymer to receive additives is provided as a fluidized bed of polymer granules and is contacted with an aqueous dispersion of additive or additives.

The specific size or size range of the polyolefin granules to be coated is not critical provided that the granules are of a fluidizable size. Expressed differently, the polymer granules have particle sizes such that they can be maintained as a fluidized bed by gases at reasonable pressures. Such particle granules have an average particle size from about 0.4mm to about 6 mm although granules having an average particle size from about 0.5 mm to about 5 mm are preferred.

Such particles are fluidized by methods well known in the art as by passing gas upwardly through a bed of particles. Suitable gases are relatively inert to the polymer under the conditions of the fluidization and are illustrated by air, nitrogen or carbon dioxide. The preferred gas for use in the fluidized bed is air. The fluidization of the polymer granules maintains a substantially constant movement of the polymer particles throughout the bed to enable substantially uniform coating of the additive upon the polymer granules. The fluidization gas is supplied at a rate sufficient to maintain the polymer granules in a fluidized state. The precise flow rates will vary, depending in part upon the size of the polymer granules. Typical flow rates at which the fluidization gas is employed are from about 20 ft$^3$/min to about 200 ft$^3$/min, with flow rates from about 30 ft$^3$/min to about 100 ft$^3$/min being preferred.

The temperature at which the aqueous dispersion of additive contacts the fluidized bed is not critical provided that neither the polymer nor additive is adversely affected chemically or physically by the temperature of the contacting and the polymer granules do not become sufficiently "tacky" or "sticky" so that fluidization becomes unduly difficult. Suitable application temperatures are from about 20° C. to about 260° C. However, it is a characteristic of the process of the present invention that the process is effective at relatively low temperatures, e.g., at or about ambient temperature. The preferred contacting temperatures are from about 15° C. to about 30° C. and the use of such temperatures provides an economic benefit of reduced energy requirements.

The additives to be employed in the coating process of the invention are those additives conventionally employed to improve or modify the processability and properties of the polyolefin polymer. Such additives include acid acceptors such as metallic stearates and hydrotalcites, ultraviolet light stabilizers including hindered amine stabilizers, and antioxidants including hindered phenols exemplified by the broad class of commercial antioxidants containing the 3,5-di-tert-butyl-4-hydroxyphenyl moiety and hydrolysis-resistant fluorophosphonite processing stabilizers. The preferred additives to be applied according to the process of the invention are antioxidants, particularly hindered phenolic antioxidants, processing stabilizers and acid acceptors.

The additive or combination of additives, whose provision to the polymer granules is desired, is dispersed, suspended or even partially dissolved in the water used to produce the aqueous dispersion. The precise ratio of quantity of additive to amount of water is variable but the ratio should be such that the dispersion is fluid and capable of being sprayed onto the fluidized bed. Concentrations of additive from about 2% by weight to about 65% by weight based on total dispersion are suitable. Concentrations of additive from about 25% by weight to about 50% by weight on the same basis are preferred.

The process of the invention comprises the formation of a fluidized bed of the polymer at the temperature of application by passing the fluidizing gas upwardly through the polymer granules in a suitable contacting device. Mechanical devices in which fluidized beds are formed and maintained are well known and a number are commercial. The aqueous dispersion is then applied under pressure as by spraying through a nozzle or similar spraying device which is preferably located below the bed. The size of the spraying device or the openings therein is not material provided that a uniform coating of the dispersion mixture can be applied to the polymer granules while maintained in the fluidized bed. This uniformity of coating is provided by the spraying of the dispersion, as well as by deposition of additive on polymer granule that has been wet with dispersion and by physical exchange of dispersion among the polymer granules. The flow of the fluidizing gas promotes uniform coating but also serves to vaporize the water carrier of the aqueous dispersion so that the product of the spraying process is a dry polymer granule having a substantially uniform distribution of additive on the granule surface.

The process of the invention offers distinct advantages over other processes of supplying additives to polymeric materials in that it operates at relatively low temperatures and the water deactivates the catalyst, thereby avoiding the need for separate catalyst deactivation processes and equipment. This provides savings of energy and enables reduced dependence on mechanical equipment. It also provides additive-containing polymer in the form of granules rather than pellets and thereby eliminates the need for additional melting of the polymer and thus improves oxidative stability of the polymer.

The invention is further illustrated by the following Illustrative Embodiment which should not be regarded as limiting. The Illustrative Embodiment relates to treating an unstabilized polypropylene with an aqueous dispersion of additives and measuring the thermo-oxidative and processing stability and the corrosivity of the resulting polypropylene compositions. The polypropylene to be stabilized was a granular homopolymer of nominal 4 melt flow. The average particle size was about 1.5 mm and the bulk density was 0.46 g/cc. Various combinations of additives were applied to the polypropylene and the properties of the resulting compositions were compared with corresponding properties of unstabilized polypropylene.

The thermal oxidative stability of the polypropylene samples was measured in a standard oven aging test using compression-molded plaques of 2 in. × 2.5 in. × 10 mil dimensions. The test employed a forced convection hot air oven at 125° C. and followed ASTM D3012. The plaques were inspected each weekday and failure was indicated by brittleness and powdery disintegration of the polypropylene.

The processing stability of the stabilized and unstabilized polypropylene was determined by three consecutive extrusions of the granular particles in air using a ¾-inch Brabender extruder at 260° C. melt temperature and 140 rpm. After the first and third extrusions the melt flow (MF) of the pellets was determined by ASTM D1238, condition L.

The corrosivity of the samples was determined in a standard Shell Oil Company test in which 30 grams of polypropylene resin were melted in a glass cup and a mild steel disk, cooled by 18° C. water, was held 1.3 cm above the polymer surface. The molten polymer was maintained at 260° C. for 30 minutes so that the disk was exposed to vapors from the polypropylene melt. The disk was then examined under a light microscope for corrosion. The ratings of disks in this test range from A (no visible corrosion) to F (very severe corrosion).

In the Illustrative Embodiment, several aqueous dispersions were used containing conventional polymer additives. Dispersion X contained ETHANOX ® 330, ETHANOX ® 398 and DHT-4A in a 10:10:4 ratio by weight with a total additive content of 25% by weight in the dispersion. Dispersion Y contained the same ratio of additives, but with a total additive content of 5% by weight. Dispersion Z contained a 10:10:7 ratio by weight of IRGANOX ® 1010, IRGAFOS ® 168 and calcium stearate with a total additive loading of 5% by weight. ETHANOX ® 330 (Ethyl Corporation) is a hindered phenol antioxidant. ETHANOX ® 398 (Ethyl Corporation) and IRGAFOS ® 168 (Ciba-Geigy) are processing stabilizers. Hydrotalcite DHT-4A (Kyowa Chemical Industry) and calcium stearate are acid acceptors. Each dispersion also contained oxidized polyolefin wax, nonionic surfactant, antifoam, biocide and a base.

Illustrative Embodiment

The coating of the fluidized bed of polypropylene granules with the above dispersions was conducted in a Wurster type apparatus described further by Hall et al, "Controlled Release Technologies: Methods, Theory and Applications," Chapter 7, Vol. II, Kydonieus, Ed., CRC Press, Boca Raton, Florida, 1980. The coating chamber of the apparatus had a diameter of 4 in. at the bottom and 6 in. at the top. For each run, 400g of polypropylene granules were charged into the chamber and fluidized by air. The indicated dispersion was sprayed on the particles for the indicated time. The dispersion was delivered at 22° C. by a peristaltic pump to a nozzle at the base of the fluidized bed. The water of the dispersion rapidly evaporated under the airflow conditions of the fluidized bed. The dispersion coating runs are described in more detail in Table I. In each run, the fluidizing air flow rate was 35 ft$^3$/min, the atomizing air flow rate was 47 std ft$^3$/hr and the pressure of the atomizing air was 12 psi.

TABLE I

| Run | Dispersion | Total Additive, ppm | Dispersion Flow Rate, g/min | Pump Rpm | Fluidizing Air Temp. °C | Coating time, min |
|---|---|---|---|---|---|---|
| 1 | X | 2400 | 0.43 | 10 | 22 | 9.1 |
| 2 | X | 2400 | 0.43 | 10 | 86 | 7.1 |
| 3 | X | 2400 | 0.44 | 10 | 150 | 8.9 |
| 4 | Y | 2400 | 0.53 | 10 | 22 | 35.9 |
| 5 | Z | 2700 | 2.6 | 50 | 22 | 8.2 |

The properties of the polypropylene compositions thereby produced were evaluated as described above. Also measured were corresponding properties of polypropylene untreated by the process of the invention. The results are shown in Table II.

TABLE II

| Run | Oven life, days (125° C.) | Melt flow* after 1st Extrusion | Melt flow* after 3rd Extrusion | Corrosivity Rating |
|---|---|---|---|---|
| 1 | 102 | 4.8 | 5.5 | A |
| 2 | 113 | 4.8 | 5.2 | A |
| 3 | 88 | 4.7 | 5.3 | B |
| 4 | 112 | 5.0 | 5.5 | A |
| 5 | 126 | 5.3 | 6.5 | A |
| Unstabilized polypropylene | <1 | 5.7 | 13.0 | C− |

*Melt flows measured with added 0.5% wt. CYANOX ® 2246 antioxidant (American Cyanamid) to retard degradation during measurement.

What is claimed is:

1. In the process of applying additives to a fluidized bed of polymer granules to obtain a substantially uniform coating of additive on the polymer granules, the improvement comprising providing additive in the form of an aqueous dispersion.

2. The process of claim 1 wherein the dispersion is applied to the polymer granules at a temperature from about 15° C. to about 30° C.

3. The process of claim 2 wherein the concentration of additive in the dispersion is from about 3% by weight to about 70% by weight based on total dispersion.

4. In the process of applying additives to a fluidized bed of granules of polymer of at least one straight-chain α-olefin of up to 4 carbon atoms inclusive, thereby obtaining a polymer granule having a substantially uniform coating of additive on the surface thereof, the improvement comprising providing additive as an aqueous dispersion at a temperature from about 15° C. to about 260° C.

5. The process of claim 4 wherein the concentration of additive in the aqueous dispersion is from about 3% by weight to about 70% by weight based on total dispersion.

6. The process of claim 5 wherein fluidizing gas in the fluidized bed vaporizes the water of the aqueous dispersion thereby providing the coated polymer as a dry granule.

7. The process of claim 6 wherein the dispersion is applied to the polymer granules at a temperature from about 15° C. to about 30° C.

8. In the process of applying stabilizers to a fluidized bed of polypropylene granules to obtain polypropylene granules having a substantially uniform coating of stabilizer on the surface thereof, the improvement comprising providing stabilizer as an aqueous dispersion having a stabilizer concentration from about 3% by weight to about 70% by weight based on total dispersion at a temperature from about 15° C. to about 30° C.

9. A process of producing a dry polymer granule having a substantially uniform coating of additive on the surface thereof which comprises fluidizing a bed of the polymer in the form of granules with fluidizing gas at a temperature from about 15° C. to about 260° C., applying an aqueous dispersion of additive to the fluidized bed and vaporizing the water of the aqueous dispersion.

10. The process of claim 9 wherein the polymer is a polymer of at least one lower α-olefin of up to 6 carbon atoms inclusive.

11. The process of claim 10 wherein the additive is at least one of antioxidants, ultraviolet light stabilizer, processing stabilizer or acid acceptor.

12. The process of claim 11 wherein the polymer is a homopolymer or copolymer of propylene.

* * * * *